(12) United States Patent
Pensel

(10) Patent No.: US 6,758,814 B2
(45) Date of Patent: Jul. 6, 2004

(54) COMBINATION MAGNIFYING DEVICE, PARTICULARLY A MICROSCOPE COMPRISING A MEASURING DEVICE

(75) Inventor: Juergen Pensel, Altstätten (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 340 days.

(21) Appl. No.: 09/913,994

(22) PCT Filed: Dec. 22, 2000

(86) PCT No.: PCT/EP00/13154

§ 371 (c)(1),
(2), (4) Date: Jan. 9, 2002

(87) PCT Pub. No.: WO01/48528

PCT Pub. Date: Jul. 5, 2001

(65) Prior Publication Data

US 2003/0002013 A1 Jan. 2, 2003

(30) Foreign Application Priority Data

Dec. 25, 1999 (CH) .............................................. 2383/99

(51) Int. Cl.⁷ .............................. A61B 3/13; A61B 3/16
(52) U.S. Cl. ...................................... 600/398; 600/401
(58) Field of Search ................................ 600/398–406, 600/587; 351/205, 209–211, 216, 220; 606/4–6

(56) References Cited

U.S. PATENT DOCUMENTS

| | | | | |
|---|---|---|---|---|
| 4,544,243 A | * | 10/1985 | Munnerlyn | .................. 359/375 |
| 4,870,964 A | * | 10/1989 | Bailey et al. | .................... 606/6 |
| 5,098,426 A | * | 3/1992 | Sklar et al. | ...................... 606/5 |
| 5,135,299 A | | 8/1992 | Kitajima et al. | |
| 5,321,447 A | | 6/1994 | Sander et al. | |
| 5,474,066 A | | 12/1995 | Grolman | |
| 5,523,808 A | | 6/1996 | Kohayakawa | |
| 5,636,635 A | | 6/1997 | Massie et al. | |
| 6,083,160 A | * | 7/2000 | Lipman | ....................... 600/398 |

* cited by examiner

*Primary Examiner*—Mary Beth Jones
*Assistant Examiner*—David J. McCrosky
(74) *Attorney, Agent, or Firm*—Hodgson Russ LLP

(57) ABSTRACT

The invention concerns a combination of a microscope with a measurement device, in particular a diagnostic device, that is usable during an operation on or examination of a specimen performed with the microscope. During the operation or examination, specimen data that are ascertained or determined by the measurement device are directly displayable in the microscope as an optical signal. In the event the measured data of the specimen exceed or fall below threshold values and/or interval values, a warning signal is triggerable by way of which further actions, such as shutdown or switchover actions, can be automatically executed as applicable.

7 Claims, 1 Drawing Sheet

COMBINATION MAGNIFYING DEVICE, PARTICULARLY A MICROSCOPE COMPRISING A MEASURING DEVICE

CROSS REFERENCE TO RELATED APPLICATIONS

This invention claims priority of the Swiss patent application No. 2383/99 which is incorporated by reference herein.

FIELD OF THE INVENTION

The invention concerns a combination of a magnification device, in particular a microscope, with a measurement device, in particular a diagnostic device, usable during an operation on or examination of a specimen, which in particular is a human or animal body part or organ (part), performed with the magnification device or the microscope.

The invention concerns in particular a device for use during the performance of operations on the human or animal eye with a magnification device, in particular with a surgical microscope which comprises an objective system and optical devices for viewing the eye through an eyepiece system. The invention also concerns a surgical microscope for performing operations on the human or animal eye.

BACKGROUND OF THE INVENTION

Examination microscopes, surgical microscopes, and other magnification devices and diagnostic units for examination and for performing operations on various organs and organ parts are known in a number of embodiments. Some of these known units are those that are used in the performance of ophthalmic operations or for the examination of eyes.

Reference will be made hereinafter especially to microscopes or surgical microscopes, the invention not being limited thereto. In particular, these also include other magnification devices, such as loupes or the like, for observing or magnifying an object or surgical field or the like.

For example, a number of surgical microscopes for performing ophthalmic operations are known from the existing art. U.S. Pat. No. 5,135,299, for example, discloses a surgical microscope in which there is provided a special optical illumination system which is arranged and configured in such a way that the axis of the beam path of the illumination system does not coincide with the optical axis of the microscope. U.S. Pat. No. 5,321,447 concerns a surgical microscope for performing ophthalmic operations which can selectably be equipped with an ophthalmoscopy attachment that effects image erection of the intermediate image produced by an ophthalmoscope lens, transposes the observation beam paths, and allows the surgical microscope to be used selectably in conventional fashion or as an ophthalmoscope, with no need to make modifications to the surgical microscope.

Devices for the examination of eyes are, for example, tonometers, which once again exist in various embodiments. Current standard tonometers ascertain intraocular pressure by means of a narrow jet of air that is blown onto the eye, its effects on the ocular surface being ascertained. As is known, for example, from U.S. Pat. No. 5,474,066, it is possible to use for this purpose an optical unit with which the eye is illuminated and the light reflected from the eye is detected. The intraocular pressure thus ascertained is indicated on a display.

Tonometers that operate with ultrasonic waves instead of air have also already been proposed, for example in U.S. Pat. No. 5,636,635.

It is furthermore known to combine with one another diagnostic units that ascertain or determine different measurement or examination data of the eye. A combination of a tonometer with a second diagnostic unit for examining the back of the eye is known, for example, from U.S. Pat. No. 5,523,808. The tonometer used here works with air that is blown onto the cornea through a nozzle positioned in front of the eye. The nozzle blows air onto the eye in a position that lies slightly outside the optical axis of the second optical examination device. Because of the curvature of the cornea, the latter is acted upon with air substantially perpendicularly.

In certain ophthalmic operations, the danger exists that inadvertent damage may occur, for example, to the retina. This can be the case, for example, if the administration of certain medications can result in an elevation of intraocular pressure, if an operation is performed on the eye of a person who is already exhibiting elevated intraocular pressure, or also directly in conjunction with the operation. Intraocular pressure is therefore also measured before each operation.

SUMMARY OF THE INVENTION

In many operations or examinations, it is fundamentally desirable to have available certain parameters of the specimen in question that cannot be ascertained by way of the particular surgical method or examination method, so that the operation or examination can be performed as optimally as possible, in particular without endangering the patient or the specimen being examined. A solution to this problem is therefore the fundamental object of the invention.

In particular, it is the object of the invention to be able to prevent, at least in most cases, the occurrence of damage to the eye during an operation as a consequence of intraocular pressure.

The basic object is achieved, according to the present invention, in that during the operation or examination, specimen data that are ascertained or determined by the measurement device are directly displayable in the microscope as an optical signal; and/or that in the event the measured data of the specimen exceed or fall below threshold values and/or interval values, especially as a function of further parameters such as time or temperature, a warning signal is triggerable by way of which further actions, such as shutdown or switchover actions, can be automatically executed as applicable.

As far as the performance of ophthalmic operations is concerned, the stated object is achieved, according to the present invention, in that in combination with the microscope a tonometer for measuring and ascertaining intraocular pressure during the operation is provided; and that either the surgical microscope comprises an apparatus for reflecting into the eyepiece system at least one optical signal that is correlated with the intraocular pressure, or the tonometer, upon occurrence of a pathological intraocular pressure value, emits a signal that is audible in the microscope area.

In novel fashion and according to the present invention, therefore, simultaneous measurement of the eye or specimen occurs during observation thereof through the magnification device.

One design of a surgical microscope configured according to the present invention comprises a device with which at least one optical signal that correlates with data concerning the intraocular pressure of the eye presently being operated on can be reflected into the eyepiece system.

The invention allows a modification of the manipulating technique of the microscopically observing entity or operating entity in accordance with the situation. This can be, for example, automatic stoppage of the procedure in question, for example the surgical intervention. In this context, let it be mentioned that the term "microscopically observing entity" or "operating entity" is to be understood not only as a person (a surgeon) but also as a micromanipulator or a robot, the latter also, as a rule, forwarding optical data and signals via telecommunications to an observing or controlling person.

In the context of ophthalmic operations in particular, the invention permits the operator to ascertain and observe the intraocular pressure and its changes during the operation and to react promptly when necessary, whether by administering medications or by taking other appropriate actions.

According to a preferred embodiment of the invention, the optical signal is reflected in from outside. This simplifies the construction of the entire device and the construction of the optical device required in the surgical microscope for reflection.

In one of the variant embodiments of the invention, the optical signal can be the measured value ascertained by the tonometer and displayed on a display. The operator is thereby given the capability of reading, in the microscope, the measured value that is actually being ascertained.

In a further variant embodiment of the invention, the optical signal is the light of a warning lamp. This very simple embodiment, requiring little complexity, is also favorable for the operator, since he or she needs to pay attention only to the light of a warning lamp. One economical and reliable embodiment provides for the light to be a spot of light, in particular an LED display.

In order to give the operator the opportunity to concentrate entirely on his or her activity, it is advantageous if the optical signal is reflected in only if a value exceeds or falls below a previously established threshold.

Alternatively or additionally, according to a further variant embodiment of the invention provision can be made for the optical signal to change color conspicuously (e.g. green, yellow, red) in the event a value exceeds or falls below a previously established threshold. This feature as well makes it easy for the operator to observe the signal.

Another contribution to a simple and reliable configuration for the entire device and the surgical microscope is made if the display and the warning light are directly coupled to the tonometer in terms of data.

In order to direct the operator's attention to an even greater degree to a situation that may be dangerous, provision can further be made for the optical signal to be combined with an acoustic signal; or for the acoustic signal to occur instead of an optical signal.

BRIEF DESCRIPTION OF THE DRAWINGS

The invention will now be explained in more detail with reference to the drawings, which depict an exemplary embodiment. The single Figure of the drawings, FIG. 1, schematically depicts one possible combination according to the present invention of a surgical microscope with a tonometer.

DETAILED DESCRIPTION OF THE INVENTION

Figure 1:
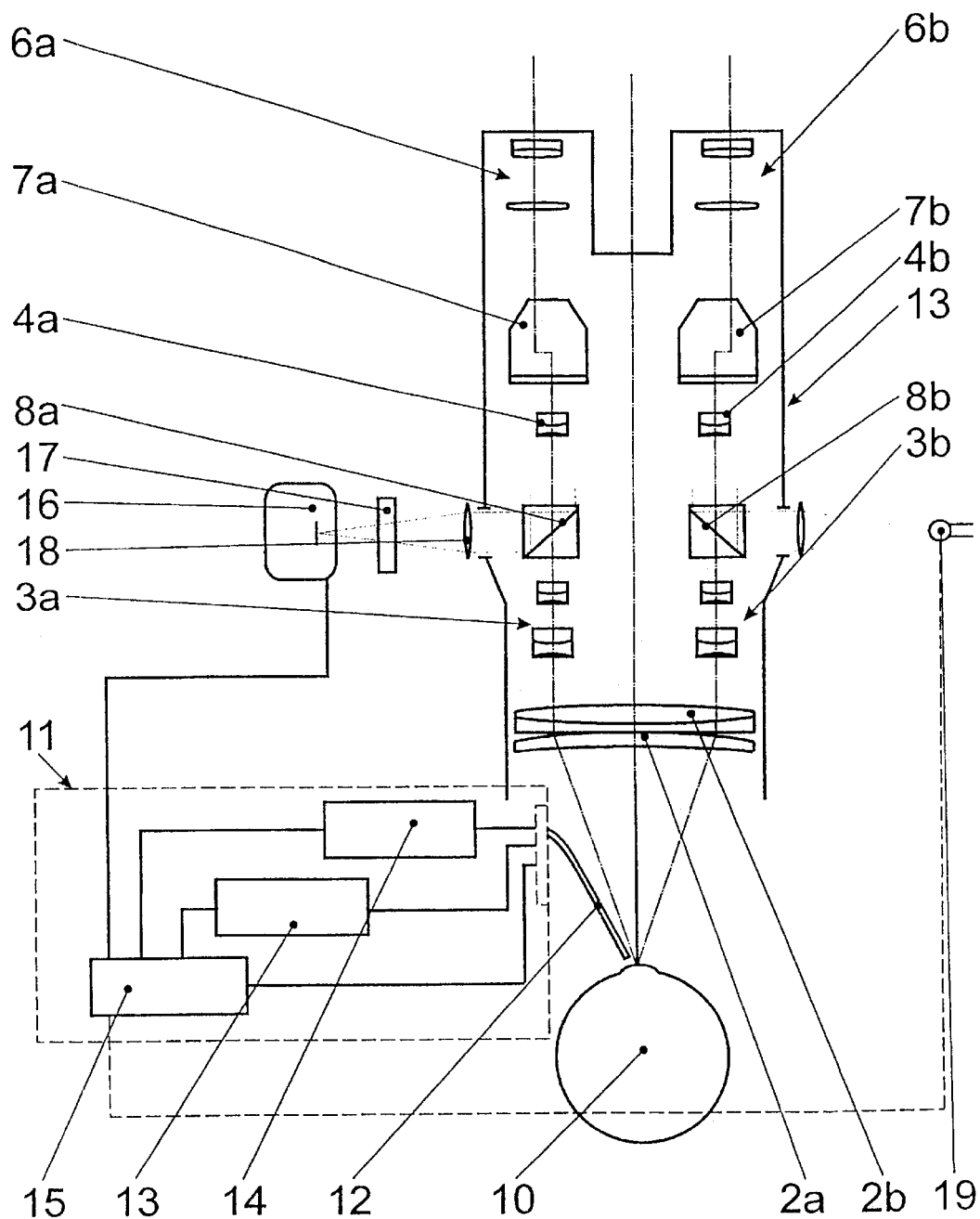

The embodiment of a surgical microscope 1 depicted in the Figure comprises as the essential optical component a main objective 2a, 2b through which an eye 10 previously placed in front of it can be observed, magnification changers 3a, 3b, tube lenses 4a, 4b, and erecting prisms 7a, 7b for the two separate beam paths. Arranged between magnification changers 3a, 3b and tube lenses 4a, 4b in each beam path is a beam splitter 8a, 8b whose purpose will be discussed later. Instead of both beam splitters 8a, 8b, it is also possible for only one of these beam splitters to be provided. Stereoscopic observation takes place through two binocular tubes 6a, 6b. The configuration of surgical microscope 1 fundamentally corresponds, with the exception of beam splitters 8a, 8b, to a usual configuration as known from the existing art. Beam splitters for reflecting in data of other kinds, for example for reflecting in CT or MRI data, are also part of the existing art.

In FIG. 1, surgical microscope 1 is positioned with respect to eye 10 being operated on so that its optical axis coincides with the visual axis of eye 10. Also simultaneously positioned in front of eye 10 is a tonometer 11, which in this exemplary embodiment is a tonometer functioning in non-contact fashion that thus ascertains the intraocular pressure without eye contact, in particular by way of compressed air pulses applied onto the eye. Tonometer 11 comprises a nozzle 12, to be positioned in front of the eye, through which the cornea can be acted upon by compressed air. As already mentioned, tonometer 11 is not the subject matter of the invention and can be configured, for example, according to U.S. Pat. No. 5,474,066 or 5,636,635, or can be one of the other units obtainable through appropriate commercial channels. Information relating thereto, in particular in the drawings and descriptions of the drawings of the aforecited documents of the existing art, is also considered disclosed herein.

In the exemplary embodiment depicted, tonometer 11 comprises a device 13 for generating compressed air; an optical unit 14 comprising a light source 14 that is provided for illuminating eye 10 and for detecting light reflected from eye 10; and an electronic computer unit 15 which on the one band controls and regulates all the functions of tonometer 11 and on the other hand receives and evaluates the measured data that are determined, and thus ascertains and displays the respective intraocular pressure.

According to the invention, in ophthalmic operations that are performed with surgical microscope 1 the intraocular pressure, and thus also any changes therein, is ascertained via tonometer 11 continuously or at, in particular, regular time intervals. In order to ensure prompt and constant observation of the measured data by the operator and to ensure a quick reaction in the event a value exceeds or falls below a specific threshold, an optical signal is reflected into the eyepiece of surgical microscope 1. For that purpose, the measured data ascertained, in the exemplary embodiment, via computer unit 15 are displayed optically on a display 16 as a measured value which is transferred into the interior of the microscope via an optical device in microscope 1 that comprises e.g. a stop 17 and a lens 18, directed via beam splitter 8 a into the beam path in the direction of binocular tubes 6a, 6b, and thus displayed inside microscope 1.

Provision can then be made for the measured data to be reflected in either continuously or only if a value has already exceeded or fallen below a specific threshold that can be previously established. In this context, provision can also be made for the color of the display to change if certain values become too high or too low. It is suitable in this context, for example, for measured data that are considered safe to be reflected in in green, and for those data that require more detailed examination or should trigger an immediate reaction to be reflected in in red.

Additionally or alternatively, according to a further exemplary embodiment that is also shown in FIG. 1, provision is made for a warning lamp 19 to be activated via computer unit 15. Warning lamp 19, which can be an LED display, lights up when specific measured data exceed or fall below a limit. The light of warning lamp 19 is reflected into the eyepiece of surgical microscope 1 by means of a lens 20 and via beam splitter 8b. A safe measured value can appear, for example, as a green, in particular spot-shaped, light in the eyepiece; if specific measured values exceed or fall below a threshold, that spot of light can change color, in particular to red. The optical signal display can moreover also be supplemented with or replaced by an acoustic signal.

The intraocular pressure normally fluctuates only slightly around 17 mmHg. The fact that the value exceeds, for example, 20 mmHg, perhaps also for a longer period of time, may therefore be considered a situation in which a corresponding warning is given to the operator via one of the means described. A decrease in intraocular pressure can also be indicated in this fashion.

The invention can be used for routine monitoring in certain ophthalmic operations in which the possibility exists of an excessive rise in intraocular pressure, for example because of the administration of medications. The invention is of particular advantage in the context of ophthalmic operations on persons who belong to the risk group of those in whom an elevated intraocular pressure has already been identified.

The invention is not limited to the exemplary embodiment depicted and described. In addition to the further possibilities already mentioned in the specification, reference is made in particular to the fact that the surgical microscope can be configured differently from the embodiment depicted. In principle, for most known and obtainable surgical microscopes, the tonometer measured values can be reflected in by way of simple adaptations in design.

In the case of loupes or the like, reflecting in can be omitted in some circumstances by the fact that the warning signal is mounted directly on the loupe in the visible area. In special cases, for example, it can be configured as a miniature bulb or LED or the like directly on the rim of the loupe.

The tonometer can moreover function with ultrasonic waves or by contact measurement, instead of with compressed air.

A surgical microscope according to the present invention can furthermore be equipped with an ophthalmoscopy attachment for microscopic observation of the fundus or of areas of the vitreous body of the eye near the fundus.

The embodiment of a surgical microscope 1 depicted in the Figure comprises as the essential optical component a main objective 2a, 2b through which an eye 10 previously placed in front of it can be observed, magnification changers 3a, 3b, tube lenses 4a, 4b, and erecting prisms 7a, 7b for the two separate beam paths. Arranged between magnification changers 3a, 3b and tube lenses 4a, 4b in each beam path is a beam splitter 8a, 8b whose purpose will be discussed later. Instead of both beam splitters 8a, 8b, it is also possible for only one of these beam splitters to be provided. Stereoscopic observation takes place through two binocular tubes 6a, 6b. The configuration of surgical microscope 1 fundamentally corresponds, with the exception of beam splitters 8a, 8b, to a usual configuration as known from the existing art. Beam splitters for reflecting in data of other kinds, for example for reflecting in CT or MRI data, are also part of the existing art.

In FIG. 1, surgical microscope 1 is positioned with respect to eye 10 being operated on so that its optical axis coincides with the visual axis of eye 10. Also simultaneously positioned in front of eye 10 is a tonometer 11, which in this exemplary embodiment is a tonometer functioning in non-contact fashion that thus ascertains the intraocular pressure without eye contact, in particular by way of compressed air pulses applied onto the eye. Tonometer 11 comprises a nozzle 12, to be positioned in front of the eye, through which the cornea can be acted upon by compressed air. As already mentioned, tonometer 11 is not the subject matter of the invention and can be configured, for example, according to U.S. Pat. No. 5,474,066 or 5,636,635, or can be one of the other units obtainable through appropriate commercial channels. Information relating thereto, in particular in the drawings and descriptions of the drawings of the aforecited documents of the existing art, is also considered disclosed herein.

In the exemplary embodiment depicted, tonometer 11 comprises a device 13 for generating compressed air; an optical unit 14 comprising a light source 14 that is provided for illuminating eye 10 and for detecting light reflected from eye 10; and an electronic computer unit 15 which on the one hand controls and regulates all the functions of tonometer 11 and on the other hand receives and evaluates the measured data that are determined, and thus ascertains and displays the respective intraocular pressure.

According to the invention, in ophthalmic operations that are performed with surgical microscope 1 the intraocular pressure, and thus also any changes therein, is ascertained via tonometer 11 continuously or at, in particular, regular time intervals. In order to ensure prompt and constant observation of the measured data by the operator and to ensure a quick reaction in the event a value exceeds or falls below a specific threshold, an optical signal is reflected into the eyepiece of surgical microscope 1. For that purpose, the measured data ascertained, in the exemplary embodiment, via computer unit 15 are displayed optically on a display 16 as a measured value which is transferred into the interior of the microscope via an optical device in microscope 1 that comprises e.g. a stop 17 and a lens 18, directed via beam splitter 8a into the beam path in the direction of binocular tubes 6a, 6b, and thus displayed inside microscope 1.

Provision can then be made for the measured data to be reflected in either continuously or only if a value has already exceeded or fallen below a specific threshold that can be previously established. In this context, provision can also be made for the color of the display to change if certain values become too high or too low. It is suitable in this context, for example, for measured data that are considered safe to be reflected in in green, and for those data that require more detailed examination or should trigger an immediate reaction to be reflected in in red.

Additionally or alternatively, according to a further exemplary embodiment that is also shown in FIG. 1, provision is made for a warning lamp 19 to be activated via computer unit 15. Warning lamp 19, which can be an LED display, lights up when specific measured data exceed or fall below a limit. The light of warning lamp 19 is reflected into the eyepiece of surgical microscope 1 by means of a lens 20 and via beam splitter 8b. A safe measured value can appear, for example, as a green, in particular spot-shaped, light in the eyepiece; if specific measured values exceed or fall below a threshold, that spot of light can change color, in particular to red. The optical signal display can moreover also be supplemented with or replaced by an acoustic signal.

The intraocular pressure normally fluctuates only slightly around 17 mmHg. The fact that the value exceeds, for example, 20 mmHg, perhaps also for a longer period of time, may therefore be considered a situation in which a corresponding warning is given to the operator via one of the means described. A decrease in intraocular pressure can also be indicated in this fashion.

The invention can be used for routine monitoring in certain ophthalmic operations in which the possibility exists of an excessive rise in intraocular pressure, for example because of the administration of medications. The invention is of particular advantage in the context of ophthalmic operations on persons who belong to the risk group of those in whom an elevated intraocular pressure has already been identified.

The invention is not limited to the exemplary embodiment depicted and described. In addition to the further possibilities already mentioned in the specification, reference is made in particular to the fact that the surgical microscope can be configured differently from the embodiment depicted. In principle, for most known and obtainable surgical microscopes, the tonometer measured values can be reflected in by way of simple adaptations in design.

In the case of loupes or the like, reflecting in can be omitted in some circumstances by the fact that the warning signal is mounted directly on the loupe in the visible area. In special cases, for example, it can be configured as a miniature bulb or LED or the like directly on the rim of the loupe.

The tonometer can moreover function with ultrasonic waves or by contact measurement, instead of with compressed air.

A surgical microscope according to the present invention can furthermore be equipped with an ophthalmoscopy attachment for microscopic observation of the fundus or of areas of the vitreous body of the eye near the fundus.

PARTS LIST

| | |
|---|---|
| 1 | Surgical microscope |
| 2a, 2b | Main objective |
| 3a, 3b | Magnification changers |
| 4a, 4b | Tube lenses |
| 7a, 7b | Erecting prisms |
| 6a, 6b | Binocular tubes |
| 8a, 8b | Beam splitters |
| 10 | Eye |
| 11 | Tonemeter |
| 12 | Nozzle |
| 13 | Device for generating compressed air pulses |
| 14 | Optical unit |
| 15 | Computer unit |
| 16 | Display |
| 17 | Stop |
| 18 | Lens |
| 19 | Warning lamp |
| 20 | Lens |

What is claimed is:

1. A combination comprising:

a surgical microscope for observing a magnified image of an eye of a patient during performance of a surgical operation involving the eye;

a non-contact tonometer arranged to measure intraocular pressure of the eye during the surgical operation, the non-contact tonometer operating independently of the surgical microscope to provide an intraocular pressure value;

a display connected to the non-contact tonometer for generating an optical signal based on the intraocular pressure value; and an optical element arranged along an observation beam path of the surgical microscope for reflecting the optical signal into the observation beam path;

whereby the optical signal is observable with the magnified image of the eye.

2. The combination according to claim 1, wherein the optical signal includes a numerical representation of the intraocular pressure value.

3. The combination according to claim 1, wherein the optical signal includes light from a warning light source that is illuminated if the intraocular pressure value is outside of a predetermined normal range.

4. The combination according to claim 1, where in the optical signal changes color if the intraocular pressure value is outside of a predetermined normal range.

5. The combination according to claim 1, further comprising a sound-making device connected to the non-contact tonometer for generating an acoustic signal based on the intraocular pressure value.

6. The combination according to claim 1, wherein the optical element is a beam splitter.

7. A combination comprising:

a surgical microscope for observing a magnified image of an eye of a patient during performance of a surgical operation involving the eye;

a non-contact tonometer arranged to measure intraocular pressure of the eye during the surgical operation, the non-contact tonometer operating independently of the surgical microscope to provide an intraocular pressure value; and a sound-making device connected to the non-contact tonometer for generating an acoustic signal based on the intraocular pressure value.

* * * * *